(No Model.)  3 Sheets—Sheet 1.
S. W. HARMAN.
STEAM COOKER.
No. 496,056. Patented Apr. 25, 1893.
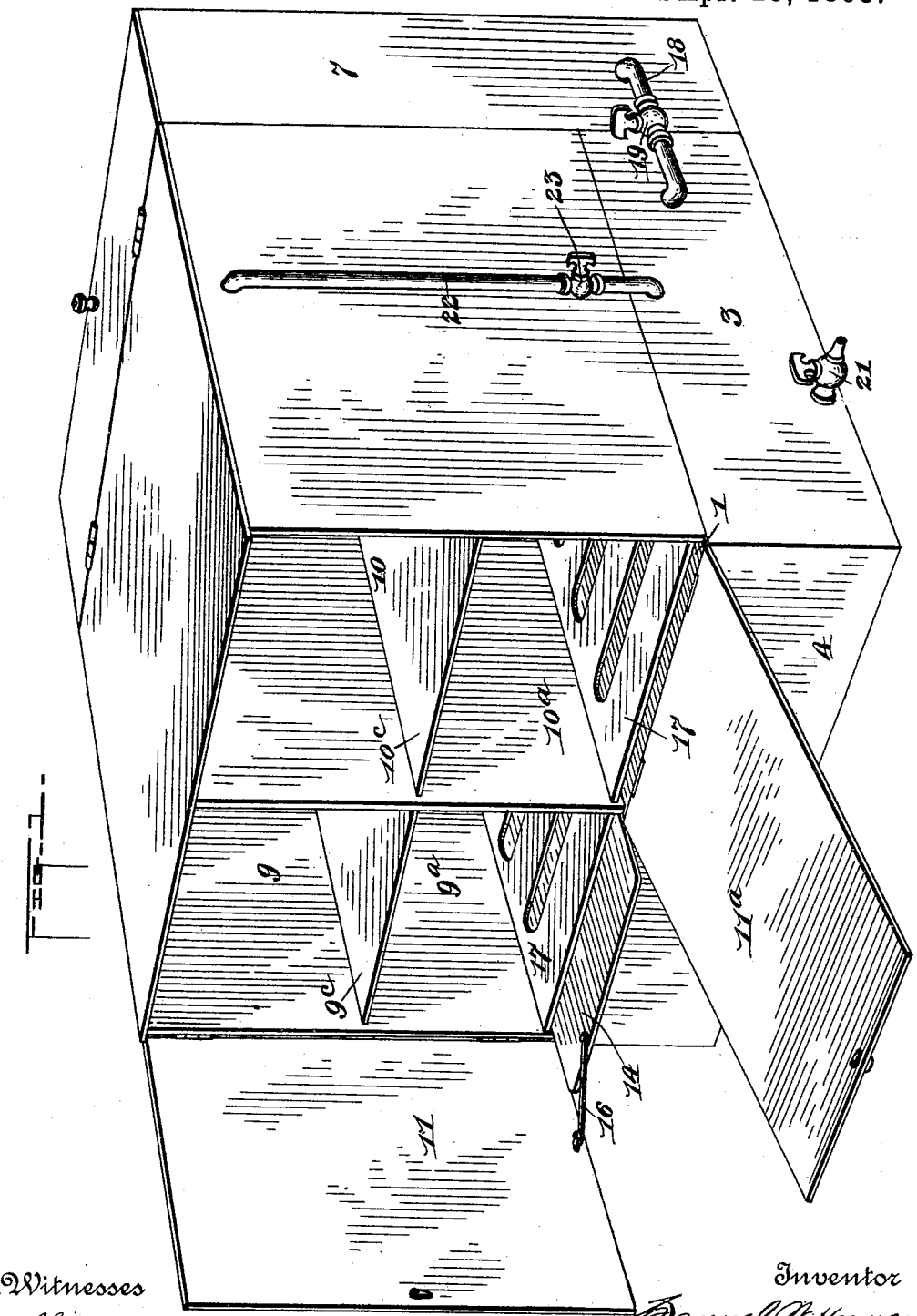
Witnesses
Severance
C. Hires
Inventor
Samuel W. Harman,
By J. B. Lawyer
Attorney
THE NORRIS PETERS CO., PHOTO-LITHO., WASHINGTON, D. C.

(No Model.) 3 Sheets—Sheet 2.
S. W. HARMAN.
STEAM COOKER.
No. 496,056. Patented Apr. 25, 1893.
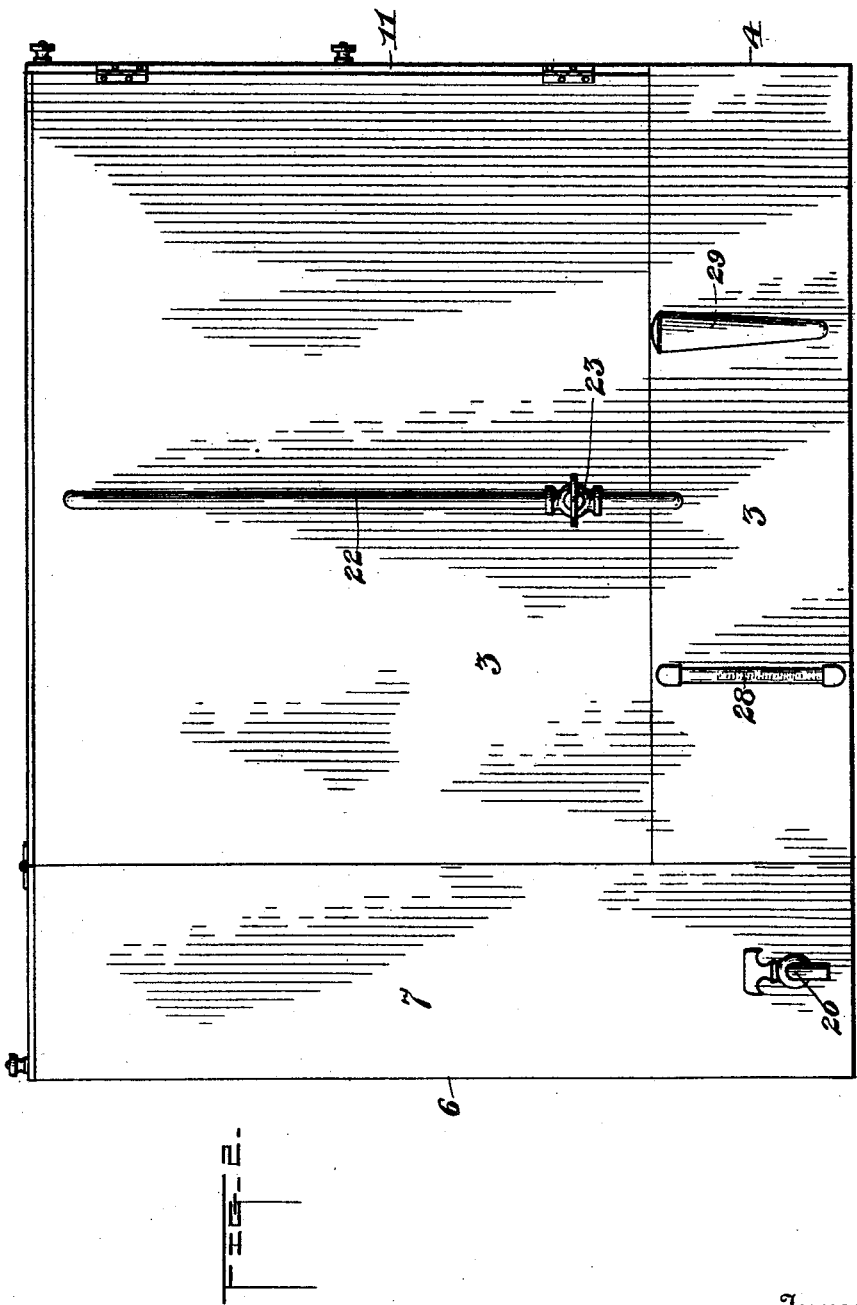
Witnesses
Inventor
Samuel W. Harman
By J. B. Lawyer
Attorney

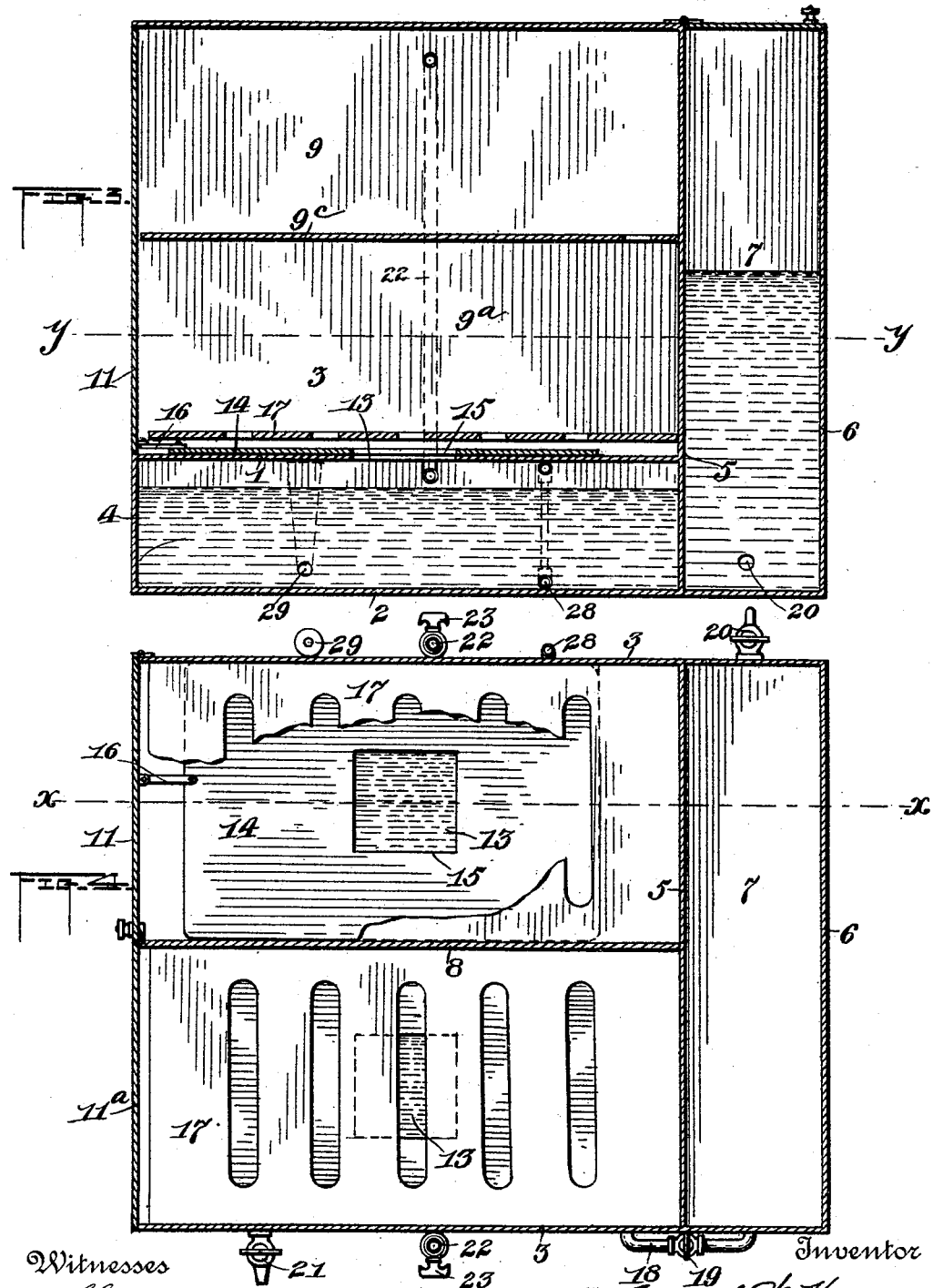

UNITED STATES PATENT OFFICE.

SAMUEL W. HARMAN, OF ROGERS, ARKANSAS.

STEAM-COOKER.

SPECIFICATION forming part of Letters Patent No. 496,056, dated April 25, 1893.

Application filed August 12, 1892. Serial No. 442,849. (No model.)

*To all whom it may concern:*

Be it known that I, SAMUEL W. HARMAN, a citizen of the United States, residing at Rogers, in the county of Benton and State of Arkansas, have invented certain new and useful Improvements in Steam-Cookers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain improvements in steam cookers, and they consist in the construction, arrangement and combination of the several parts of which it is composed, as will be hereinafter more fully described and claimed.

Referring to the accompanying drawings in which corresponding parts are designated by corresponding numbers: Figure 1, is a perspective view of a cooker constructed in accordance with this invention, the doors thereof being open. Fig. 2, is a side elevation. Fig. 3, is a longitudinal vertical section upon one side of the central line, the door being closed, the line of section being $x-x$ Fig. 4. Fig. 4, is a horizontal section, on line $y-y$ of Fig. 3.

The cooker consists of a suitable rectangular metallic body having near its bottom a partition 1, forming with the bottom, 2, sides, 3, front, 4, and vertical partition, 5, a boiler 6, the said partition 5, extending from the bottom, 2, to the top of the cooker, and forming with the back, and sides and bottom, a reservoir 7, which is open at the top. The interior of the upper forward portion of the cooker in front of the reservoir, and above the boiler is divided by a vertical partition, 8, into two compartments which I have shown as being further divided into sub-compartments 9, and 9ª, and 10 and 10ª, by the horizontal partitions 9ᶜ and 10ᶜ, the fronts of all of which are adapted to be closed by doors 11, and 11ª which as shown may be suitably hinged at the side or bottom. The horizontal partition 1, forming the bottom of each of the lower compartments 9ª and 10ª has an aperture 13, communicating between each of the said lower compartments and the boiler, in order to permit the entrance of the steam into the former from the latter. As it is desirable that these apertures be closed when opening the doors 11, 11ª a plate 14, having an aperture 15, therein, is placed on the bottom of each of the said lower compartments, the apertures 15, normally registering with the apertures 13, and the said plates being pivotally connected to the doors by the links 16, so that in opening the doors, the plates will be drawn out, closing the apertures 13, while upon closing the doors the plates will be shoved back, opening the apertures. A perforated guard plate 17 is contained in each of the said lower compartments 9ª and 10ª above the plates 14 therein, thus serving as supports for the articles it may be desired to place therein. A pipe 18, having a stop cock 19, has its opposite ends projecting inwardly through one of the sides 3, and communicating with the base of the reservoir, 7, and the boiler respectively in order that water may be admitted into the latter, from the former, as may be required, while a water gage 28 and steam whistle 29 located on the opposite side 3 of the boiler are adapted to indicate the water level therein, and to give warning of low water respectively.

A faucet 20 is placed in one side of the reservoir to facilitate the drawing of the hot water therefrom as may be required for domestic use, while a similar faucet 21 in the side of the boiler permits the emptying thereof. A pipe 22 having a cock 23 therein is placed on each side of the cooker, and has its lower end projecting through the side of the boiler, and its upper end projecting into the corresponding upper compartments 9 and 10, whereby these compartments are supplied with steam for cooking purposes.

From the above it will be evident that on placing the cooker upon a suitable source of heat, and manipulating the various cocks, any articles placed within the several compartments may be properly cooked.

Having thus described my invention, what I claim is—

1. The combination in a steam cooker, of a boiler and a cooking compartment thereabove, of a perforated partition between the two, a door for the said compartment, an apertured sliding plate resting above the said partition, and a link connecting the said door and plate whereby they will be caused to move together substantially as described.

2. In a steam cooker, the combination with a suitable rectangular body having a horizontal perforated partition near its bottom forming a boiler, a vertical partition near its back, forming a reservoir in its rear, and a plurality of cooking compartments in its front, above the said boiler, a door for the said compartments, a sliding apertured plate resting upon the perforated horizontal partition and contained in the lower part of the said compartments, a link connecting the said plate and door, pipes provided with suitable cocks connecting the said boiler with the reservoir and upper part of the said compartments, and a faucet in the side of the said reservoir substantially as described.

In testimony whereof I affix my signature in presence of two witnesses.

SAMUEL W. HARMAN.

Witnesses:
W. A. MUNDELL,
J. J. BARNETT.